United States Patent [19]

Ichimaru et al.

[11] Patent Number: 4,709,751

[45] Date of Patent: Dec. 1, 1987

[54] VEHICULAR AIR CONDITIONER WITH DEFOGGING FEATURE

[75] Inventors: Yoshiro Ichimaru, Yokohama; Shigeru Kobayashi, Zama; Toshio Ohashi, Atsugi, all of Japan

[73] Assignee: Nissan Motor Company, Limited, Yokohama, Japan

[21] Appl. No.: 766,192

[22] Filed: Aug. 16, 1985

[30]  Foreign Application Priority Data

Aug. 20, 1984 [JP]   Japan .............................. 59-171483

[51] Int. Cl.⁴ ..................... F25B 29/00; B60S 1/54; B60H 3/00
[52] U.S. Cl. ..................................... 165/17; 165/43; 165/16; 62/244; 98/2.08; 98/2.09
[58] Field of Search ................. 165/17, 42, 43, 16; 62/244, 239; 98/2.08, 2.09

[56]  References Cited
U.S. PATENT DOCUMENTS

| | | | |
|---|---|---|---|
| 3,191,669 | 6/1965 | Johnson et al. | 165/42 |
| 4,289,195 | 9/1981 | Bellot et al. | 165/12 |
| 4,427,056 | 1/1984 | Johnson et al. | 165/42 |
| 4,448,035 | 5/1984 | Moriyama et al. | 165/43 |
| 4,513,808 | 4/1985 | Ito et al. | 165/42 |
| 4,519,443 | 5/1985 | Sutoh et al. | 165/43 |
| 4,640,183 | 2/1987 | Doi | 165/43 |

FOREIGN PATENT DOCUMENTS

| | | | |
|---|---|---|---|
| 0060715 | 5/1981 | Japan | 62/239 |
| 0060716 | 5/1981 | Japan | 62/239 |
| 0120410 | 9/1981 | Japan | 62/239 |
| 57-77214 | 5/1982 | Japan | . |
| 0191113 | 11/1982 | Japan | 62/239 |
| 0059517 | 4/1984 | Japan | 62/239 |
| 2064824 | 6/1981 | United Kingdom | 165/42 |

*Primary Examiner*—William R. Cline
*Assistant Examiner*—John K. Ford
*Attorney, Agent, or Firm*—Schwartz, Jeffery, Schwaab, Mack, Blumenthal & Evans

[57]  ABSTRACT

A defroster outlet directs conditioned air toward a vehicle window to prevent the window from fogging over. The outlet is blocked when an air-cooling compressor is active. The outlet is unblocked when the compressor is inactive. The compressor may be activated and deactivated in accordance with the atmospheric temperature.

3 Claims, 5 Drawing Figures

VEHICULAR AIR CONDITIONER WITH DEFOGGING FEATURE

BACKGROUND OF THE INVENTION

1. Field of the Invention

This invention relates to an air conditioner for a vehicle.

2. Description of the Prior Art

Some vehicular air conditioners have defrosters for vehicle windows.

Japanese Patent Publication No. 57-77214 discloses such a vehicular air conditioner. This air conditioner includes a vent outlet and a floor outlet in addition to a defroster outlet. When the conditioner is in an automatic control position called a "BI-LEVEL" mode which is generally used in cool or cold seasons, warm air is discharged into the vehicle passenger compartment via both the vent and floor outlets. In this mode, the defroster outlet is blocked. In cases where this operation mode is used when the atmosphere is cold but the sunlight is strong, the vehicle windows sometimes fog over since the temperature of the windows is much lower than the temperature of the air within the vehicle passenger compartment.

U.S. Pat. No. 4,289,195 relates to a climate control device for the passenger compartment of a motor vehicle. When this device is operating in any of its automatic control modes, the rates of air flow through the vent, floor and defroster outlets are controlled automatically.

SUMMARY OF THE INVENTION

It is an object of this invention to provide a vehicular air conditioner including a reliable automatic defroster.

In accordance with this invention, a vehicular air conditioner includes a member defining an outlet for directing conditioned air toward a vehicle window to prevent the window from fogging over. A device blocks the outlet when a compressor is active and unblocks the outlet when the compressor is inactive.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
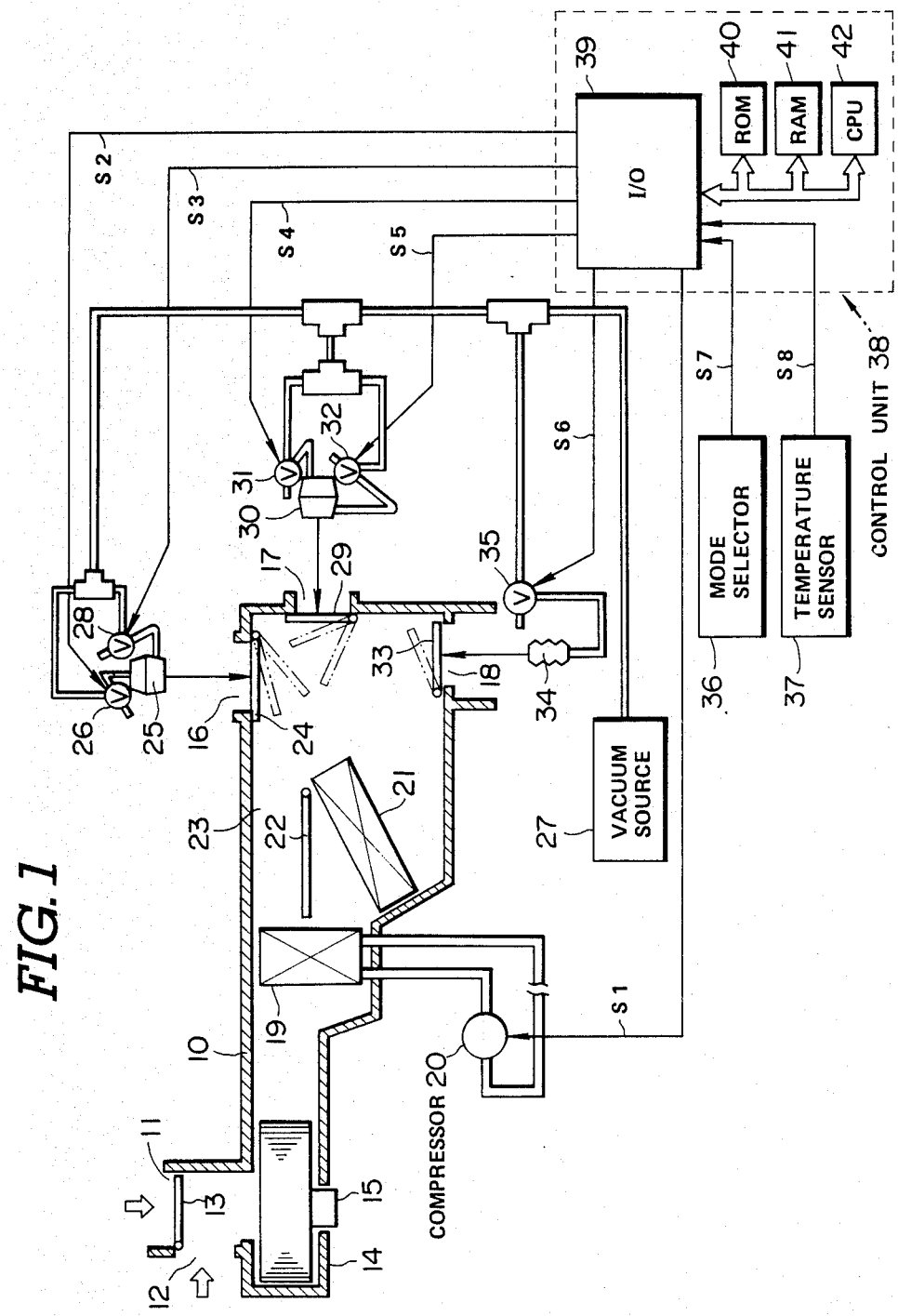
FIG. 1 is a diagram of a vehicular air conditioner according to a first embodiment of this invention.

With reference to FIG. 1, an air conditioner for a vehicle includes a duct 10 having two inlets 11 and 12 which lead from outside and inside the vehicle respectively. An intake door 13 disposed within the duct 10 can pivot between first and second positions. When the intake door 13 is in its first position, it blocks the exterior inlet 11 and unblocks the interior inlet 12. When the intake door 13 is in its second position, it unblocks the exterior inlet 11 and blocks the interior inlet 12. A fan 14 disposed within the duct 10 downstream of the intake door 13 draws in air via the inlets 11 and 12. A motor 15 drives the fan 14. When the intake door 13 is in its first position, air is drawn from the interior or the passenger compartment of the vehicle into the duct 10 via the interior inlet 12. When the intake door 13 is in its second position, air is drawn from outside the vehicle into the duct 10 via the exterior inlet 11.

The duct 10 has a defroster outlet 16, a vent outlet 17, and a floor outlet 18 downstream of the fan 14. Air driven by the fan 14 passes through the duct 10 and then exits from the duct 10 into the interior or the passenger compartment of the vehicle via the outlets 16, 17, and/or 18. The defroster outlet 16 directs the outgoing air toward vehicle front and side windows. The vent outlet 17 directs the outgoing air at chest height towards vehicle passengers. The floor outlet 18 directs the outgoing air toward the feet or legs of vehicle passengers.

A cooling system includes an evaporator 19 disposed within the duct 10 downstream of the fan 14 but upstream of the outlets 16-18. Air driven by the fan 14 passes through the evaporator 19. When the cooling system is active, the evaporator 19 cools and dehumidifies the air by evaporating refrigerant recirculated through the cooling system. When the cooling system is inactive, the evaporator 19 does not affect the air temperature.

The cooling system includes a compressor 20 controlled via a signal S1. When the compressor 20 is activated via the control signal S1, the cooling system is forced into operation. When the compressor 20 is deactivated via the control signal S1, the cooling system is rendered inactive. Specifically, the compressor 20 is coupled to a vehicular engine (not shown) via an electromagnetic clutch (not shown) supplied with the control signal S1. When the control signal S1 allows the clutch to connect the compressor 20 to the engine, the compressor 20 is activated. When the control signal S1 allows the clutch to disconnect the compressor 20 from the engine, the compressor 20 is deactivated.

A heating system includes a heater core or heat exchanger 21 disposed within the duct 10 downstream of the evaporator 19 but upstream of the outlets 16-18. The heater core 21 has internal passages through which vehicular engine coolant flows. As air passes through the heater core 21, it is heated by the core 21.

An air mix door 22 disposed within the duct 10 downstream of the evaporator 19 but upstream of the outlets 16-18 can pivot between first and second positions. When the air mix door 22 is in its first position, it blocks the front face or inlet of the heater core 21 and unblocks a passage 23 bypassing the heater core 21. In this case, essentially all of air which has entered the duct 10 bypasses the heater core 21 and then exits from the duct 10 so that the heater core 21 does not affect the temperature of outgoing air. When the air mix door 22 is in its second position, it unblocks the front face or inlet of the heater core 21 and blocks the bypass passage 23. In this case, essentially all of air flows through the heater core 21 so that the heater core 21 has a maximal effect on the temperature of outgoing air. When air mix door 22 is in a position intermediate between the first and second positions, it partially unblocks the front face or inlet of the heater core 21 and also partially unblocks the bypass passage 23. In this case, some of air flows through heater core 21 and the rest of the air bypasses the core 21 so that the core 21 has a moderate effect on the temperature of outgoing air. Thus, the air mix door 22 adjusts how much of air passes through or bypasses the heater core 21 in accordance with its position. Therefore, the temperature of outgoing air depends on the position of the air mix door 22.

Figure 2:
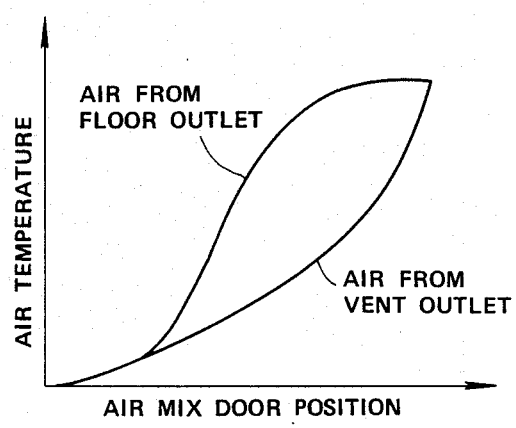
FIG. 2 is a graph of the relationship between outgoing air temperature and air mix door position in the air conditioner of FIG. 1.

The heater core 21 has different positional relationships with the vent outlet 17 and the floor outlet 18. As shown in FIG. 2, these different relationships allow the outgoing air from the floor outlet 18 to be warmer than the outgoing air from the vent outlet 17 when the air mix door 22 enables some or all of the air to pass through the heater core 21. This adds to vehicle passenger comfort.

A pivotal door 24 disposed within the duct 10 blocks and unblocks the defroster outlet 16. A pressure-responsive actuator 25 drives the defroster door 24. The actuator 25 has first and second pressure chambers. A three-way solenoid valve 26 controlled via a signal S2 has an outlet connected to the first pressure chamber of the actuator 25, a first inlet exposed to the open air, and a second inlet leading from a vacuum source 27, such as a vacuum tank connected via a check valve (not shown) to an engine air intake passage (not shown) downstream of a throttle valve (not shown). When the control signal S2 energizes and de-energizes the solenoid valve 26, the connection between the valve outlet and one of the two valve inlets is switched so that the pressure in the first chamber of the actuator 25 switches between vacuum and atmospheric pressure. A three-way solenoid valve 28 controlled via a signal S3 has an outlet connected to the second pressure chamber of the actuator 25, a first inlet exposed to the open air, and a second inlet leading from the vacuum source 27. When the control signal S3 energizes and de-energizes the solenoid valve 28, the connection between the valve outlet and one of the two valve inlets is switched so that the pressure in the second chamber of the actuator 25 switches between vacuum and atmospheric pressure. When both of the solenoid valves 26 and 28 are de-energized, the actuator 25 closes the defroster door 24. When the solenoid valve 26 is de-energized and the other valve 28 is energized, the actuator 25 partially opens the defroster door 24. When both of the solenoid valves 26 and 28 are energized, the actuator 25 fully opens the defroster door 24.

A pivotal door 29 disposed within the duct 10 blocks and unblocks the vent outlet 17. A pressure-responsive actuator 30 drives the vent door 29. The actuator 30 has first and second pressure chambers. A three-way solenoid valve 31 controlled via a signal S4 has an outlet connected to the first pressure chamber of the actuator 30, a first inlet exposed to the open air, and a second inlet leading from the vacuum source 27. When the control signal S4 energizes and de-energizes the solenoid valve 31, the connection between the valve outlet and one of the two valve inlets is switched so that the pressure in the first chamber of the actuator 30 switches between vacuum and atmospheric pressure. A three-way solenoid valve 32 controlled via a signal S5 has an outlet connected to the second pressure chamber of the actuator 30, a first inlet exposed to the open air, and a second inlet leading from the vacuum source 27. When the control signal S5 energizes and de-energizes the solenoid valve 32, the connection between the valve outlet and one of the two valve inlets is switched so that the pressure in the second chamber of the actuator 30 switches between vacuum and atmospheric pressure. When both of the solenoid valves 31 and 32 are de-energized, the actuator 30 closes the vent door 29. When the solenoid valve 31 is de-energized and the other valve 32 is energized, the actuator 30 partially opens the vent door 29. When both of the solenoid valves 31 and 32 are energized, the actuator 30 fully opens the vent door 29.

A pivotal door 33 disposed within the duct 10 blocks and unblocks the floor outlet 18. A pressure-responsive actuator 34 drives the floor door 33. The actuator 34 has a pressure chamber. A three-way solenoid valve 35 controlled via a signal S6 has an outlet connected to the pressure chamber of the actuator 34, a first inlet exposed to the open air, and a second inlet leading from the vacuum source 27. When the control signal S6 energizes and de-energizes the solenoid valve 35, the pressure chamber of the actuator 34 is supplied with vacuum and with atmospheric pressure respectively. When the solenoid valve 35 is de-energized, the actuator 34 closes the floor door 33. When the solenoid valve 35 is energized, the actuator 34 opens the floor door 33.

A manually-operated mode selector 36 having a switch or a combination of switches generates a signal S7 representing a desired air conditioner operation mode selected from among a defroster mode called a "DEF" mode, a vent mode called a "VENT" mode, a heat mode called a "HEAT" mode, and a bi-level mode called a "B/L" mode. Each time the mode selector 36 is operated, the mode represented by the signal S7 changes from one to another of these modes.

A temperature sensor 37 generates a signal S8 representing the atmospheric temperature.

A control unit 38 includes the combination of an input/output (I/O) circuit 39, a read-only memory (ROM) 40, a random-access memory (RAM) 41, and a central processing unit (CPU) 42. The I/O circuit 39 is electrically connected to the elements 36 and 37 to receive the signals S7 and S8. The I/O circuit 39 outputs the control signal S1–S6 to the elements 20, 26, 28, 31, 32, and 35 via electrical connections between the I/O circuit 39 and those elements.

Figure 3:
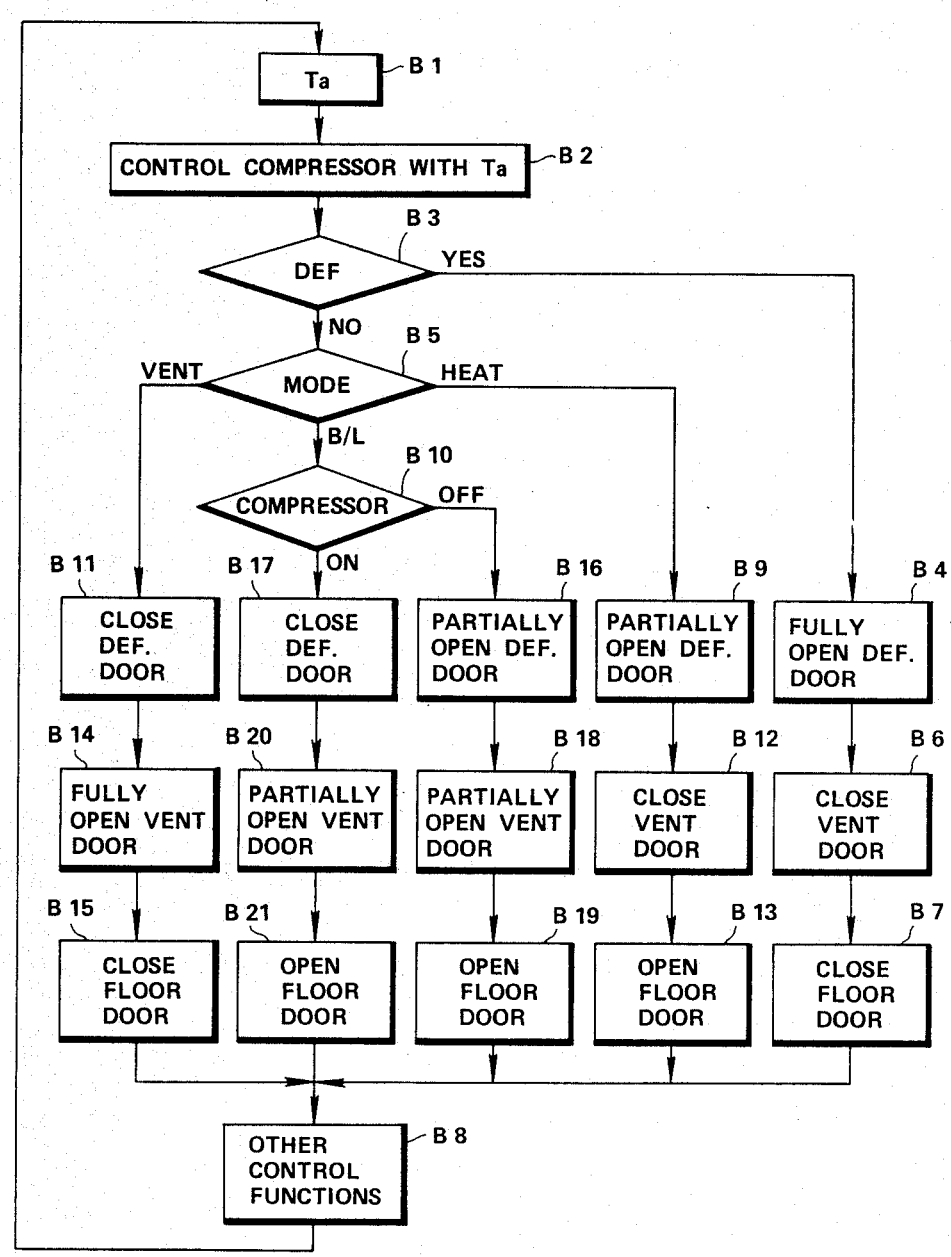
FIG. 3 is a flowchart of a program for operating the control unit of FIG. 1.

The control unit 38 operates in accordance with a program stored in the ROM 40. FIG. 3 is a flowchart of this program.

As shown in FIG. 3, in a first block B1 of the program, the current value of the atmospheric temperature is derived from the signal S8. The variable Ta represents the current atmospheric temperature in the program.

In a block B2 following the block B1, the compressor 20 is controlled via the signal S1 in accordance with the atmospheric temperature Ta.

Figure 4:
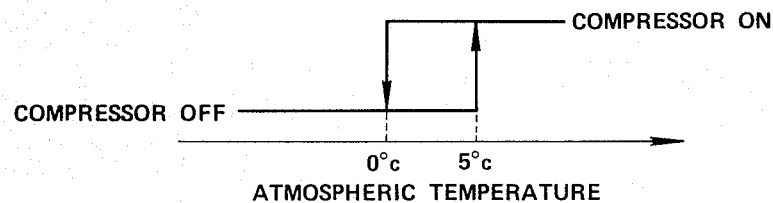
FIG. 4 is a graph of the relationship between compressor state and atmospheric temperature in the air conditioner of FIG. 1.

FIG. 4 shows the relationship between the controlled operating state of the compressor 20 and atmospheric temperature Ta. At atmospheric temperatures below a first reference point, e.g., 0° C., the compressor 20 is deactivated via the signal S1. As atmospheric temperature increases from a point below the first reference value, the compressor 20 remains deactivated until the temperature reaches a second reference point, e.g., 5° C. When atmospheric temperature reaches the second reference point, the compressor 20 is activated via the signal S1. At atmospheric temperature above the second reference point, the compressor 20 is activated. As atmospheric temperature decreases from a point higher than the second reference value, the compressor 20 remains activated until the temperature reaches the first reference point. After the atmospheric temperature reaches the first reference point, the compressor 20 is deactivated via the signal S1. The region between the first and second reference points serves as a hysteresis range for transitions between activation and deactivation of the compressor 20.

Returning to FIG. 3, in a block B3 following the block B2, the mode selection signal S7 is checked to determine whether or not it represents the "DEF" mode. If the signal S7 represents the "DEF" mode, the program advances to a block B4. If the signal S7 does not represent the "DEF" mode, the program advances to a block B5.

In the block B4, the defroster door 24 is fully opened. Specifically, both the solenoid valves 26 and 28 are energized by the signals S2 and S3, so that the actuator 25 fully opens the defroster door 24.

In a block B6 following the block B4, the vent door 29 is closed. Specifically, both of the solenoid valves 31 and 32 are de-energized by the signals S4 and S5, so that the actuator 30 closes the vent door 29.

In a block B7 following the block B6, the floor door 33 is closed. Specifically, the solenoid valve 35 is de-energized by the signal S6, so that the actuator 34 closes the floor door 33.

In this way, when the mode selection signal S7 represents the "DEF" mode, the defroster door 24 is fully opened and the vent and floor doors 29 and 33 are closed.

After the block B7, the program returns to the block B1 by way of a block B8 in which other control functions are performed, such as determining the position of the air mix door 22.

In the block B5, the mode selection signal S7 is checked to determine what mode other than the "DEF" mode has been selected. If the signal S7 represents the "HEAT" mode, the program advances to a block B9. If the signal S7 represents the "B/L" mode, the program advances to a block B10. If the signal S7 represents the "VENT" mode, the program advances to a block B11.

In the block B9, the defroster door 24 is partially opened. Specifically, the solenoid valve 26 is de-energized by the signal S2 and the solenoid valve 28 is energized by the signal S3, so that the actuator 25 partially opens the defroster door 24.

In a block B12 following the block B9, the vent door 29 is closed as in the block B6.

In a block B13 following the block B12, the floor door 33 is opened. Specifically, the solenoid valve 35 is energized by the signal S6, so that the actuator 34 opens the floor door 33.

In this way, when the mode selection signal S7 represents the "HEAT" mode, the defroster door 24 is partially opened, the vent door 29 is closed, and the floor door 33 is opened.

After the block B13, the program returns to the block B1 by way of the block B8 for the other control functions.

In the block B11, the defroster door 24 is closed. Specifically, both of the solenoid valves 26 and 28 are de-energized by the signals S2 and S3, so that the actuator 25 closes the defroster door 24.

In a block B14 following the block B11, the vent door 29 is fully opened. Specifically, both of the solenoid valves 31 and 32 are energized by the signals S4 and S5, so that the actuator 30 fully opens the vent door 29.

In a block B15 following the block B14, the floor door 33 is closed as in the block B7.

In this way, when the mode selection signal S7 represents the "VENT" mode, the defroster and floor doors 24 and 33 are closed and the vent door 29 is fully opened.

After the block B15, the program returns to the block B1 by way of the block B8 for the other control functions.

In the block B10, the state of the compressor 20 is checked. If the compressor 20 is inactive or off, the program advances to a block B16. If the compressor 20 is active or on, the program advances to a block B17. The state of the compressor 20 is checked specifically by checking the value of a variable in the program representing the level of the signal S1 and thus representing the controlled state of the compressor 20.

In the block B16, the defroster door 24 is partially opened as in the block B9.

In a block B18 following the block B16, the vent door 29 is partially opened. Specifically, the solenoid valve 31 is de-energized by the signal S4 and the solenoid valve 32 is energized by the signal S5, so that the actuator 30 partially opens the vent door 29.

In a block B19 following the block B18, the floor door 33 is opened as in the block B13.

In this way, when the mode selection signal S7 represents the "B/L" mode and the compressor 20 is inactive, the defroster and vent doors 24 and 29 are partially opened and the floor door 33 is opened.

After the block B19, the program returns to the block B1 by way of the block B8 for the other control functions.

In the block B17, the defroster door 24 is closed as in the block B11.

In a block 20 following the block B17, the vent door 29 is partially opened as in the block B18.

In a block 21 following the block B20, the floor door 33 is opened as in the block B13.

In this way, when the mode selection signal S7 represents the "B/L" mode and the compressor 20 is active, the defroster door 24 is closed, the vent door 29 is partially opened, and the floor door 33 is opened.

After the block B21, the program returns to the block B1 by way of the block B8 for the other control functions.

In cases where the "B/L" mode is selected, when the atmospheric temperature is relatively high so that the compressor 20 is activated, the defroster door 24 is closed as described previously. The activation of the compressor 20 enables the evaporator 19 to cool and dehumidify the air, preventing the vehicle windows from fogging although the defroster is at rest. Deactivation of the defroster allows conditioned air to be effectively directed toward vehicle passengers. Conversely, when the atmospheric temperature is relatively low so that the compressor 20 is deactivated, the defroster door 24 is partially opened as described previously. Although the deactivation of the compressor 20 disables the air dehumidification by the evaporator 19, actuation of the defroster door 24 to its open position prevents the vehicle front and side windows from fogging over.

It should be noted that the defroster door 24 may be controlled directly in accordance with the atmospheric temperature.

DESCRIPTION OF THE SECOND PREFERRED EMBODIMENT

Figure 5:
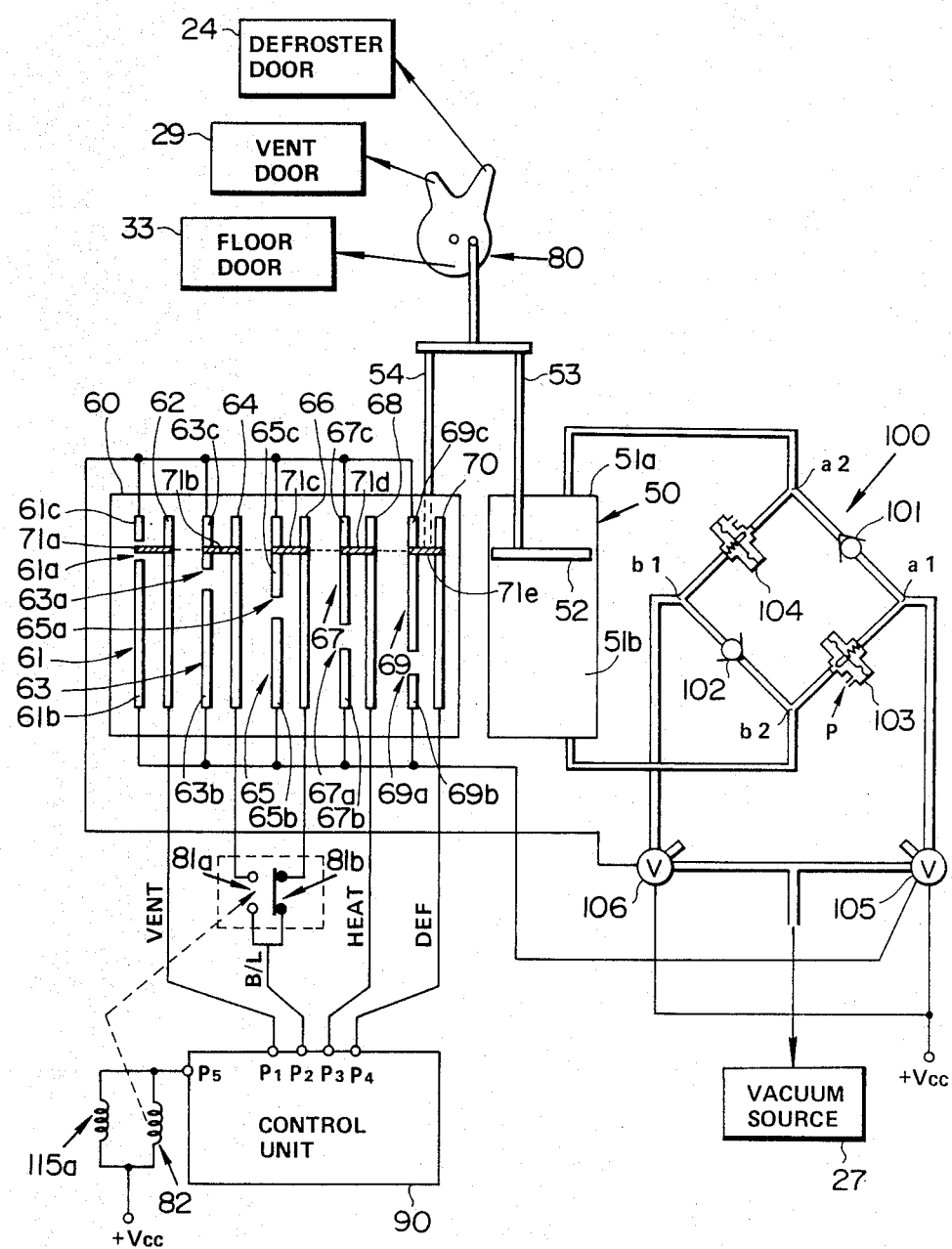
FIG. 5 is a diagram of part of a vehicular air conditioner according to a second embodiment of this invention.

With reference to FIG. 5, an air conditioner for a vehicle includes a shift actuator 50 having a cylinder 51 and a piston 52 slidably disposed within the cylinder 51.

The piston 52 is connected to a side link 80 via a rod 53 so that the link 80 moves with the piston 52. The side link 80 is connected to the defroster door 24, the vent door 29, and the floor door 33 via connecting members, such as wires. As the side link 80 moves, the doors 24, 29, and 33 are actuated.

A shift actuator switch 60 includes a pair of parallel electrodes 61 and 62 for a "VENT" mode, a pair of parallel electrodes 63 and 64 for a first "B/L" mode, a pair of parallel electrodes 65 and 66 for a second "B/L" mode, a pair of parallel electrodes 67 and 68 for a "HEAT" mode, and a pair of parallel electrodes 69 and 70 for a "DEF" mode.

The electrode 61 includes segments 61b and 61c separated by a gap 61a. The electrode 63 includes segments 63b and 63c separated by a gap 63a. The electrode 65 includes segments 65b and 65c separated by a gap 65a. The electrode 67 includes segments 67b and 67c separated by a gap 67a. The electrode 69 includes segments 69b and 69c separated by a gap 69a.

The electrode 62 is brought into and out of contact with the electrode segments 61b and 61c by an electrode 71a which slides along the electrodes 61 and 62. The electrode 64 is brought into and out of contact with the electrode segments 63b and 63c by an electrode 71b which slides along the electrodes 63 and 64. The electrode 66 is brought into and out of contact with the electrode segments 65b and 65c by an electrode 71c which slides along the electrodes 65 and 66. The electrode 68 is brought into and out of contact with the electrode segments 67b and 67c by an electrode 71d which slides along the electrodes 67 and 68. The electrode 70 is brought into and out of contact with the electrode segments 69b and 69c by an electrode 71e which slides along the electrodes 69 and 70.

The movable contacts 71a–71e are connected via insulating members so that they move as a single piece. A rod 54 fixed to this combination of the movable contacts 71a–71e extends parallel to the rod 53 and is connected to the rod 53 via a connection arm. As the piston 52 of the shift actuator 50 moves, the combination of the movable contacts 71a–71e slides along the electrode pairs.

As will be made clear hereinafter, when the "VENT" mode is selected, the movable contact 71a moves into the gap 61a in the electrode 61 and the shift actuator 50 drives the side link 80 into a position in which only the vent door 29 is open. When the "B/L" mode is selected and the compressor 20 (see FIG. 1) is active, the movable contact 71b moves into the gap 63a in the electrode 63 and the shift actuator 50 drives the side link 80 into a position in which only the vent door 29 and the floor door 33 are open. When the "B/L" mode is selected and the compressor 20 (see FIG. 1) is inactive, the movable contact 71c moves into the gap 65a in the electrode 65 and the shift actuator 50 drives the side link 80 into a position in which all of the doors 24, 29, and 33 are open. When the "HEAT" mode is selected, the movable contact 71d moves into the gap 67a in the electrode 67 and the shift actuator 50 drives the side link 80 into a position in which only the defroster door 24 and the floor door 33 are open. When the "DEF" mode is selected, the movable contact 71e moves into the gap 69a in the electrode 69 and the shift actuator 50 drives the side link 80 into a position in which only the defroster door 24 is open.

A pressure line bridge 100 has four junctions a1, a2, b1, and b2. A check valve 101 is disposed in a pressure line between the junctions a1 and a2. Another check valve 102 is disposed in a pressure line between the junctions b1 and b2. These check valves 101 and 102 include respective valve members urged by springs toward their closed positions. A vent valve 103 disposed in a pressure line between the junctions a1 and b2 includes a diaphragm separating the junctions a1 and b2. A valve member of the vent valve 103 fixed to the diaphragm selectively connects and disconnects an atmosphere vent of the valve 103 to and from the junction b2 in accordance with the pressure at the junction a1. Another vent valve 104 disposed in a pressure line between the junctions a2 and b1 includes a diaphragm separating the junctions a2 and b1. A valve member of the vent valve 104 fixed to the diaphragm selectively connects and disconnects an atmosphere vent to and from the junction a2 in accordance with the pressure at the junction b1.

The junction a1 is connected to the vacuum source 27 via a three-way solenoid valve 105 including a vent port. When the solenoid valve 105 is electrically energized and de-energized, it connects the junction a1 to the vacuum source 27 and the atmosphere respectively. The junction b1 is connected to the vacuum source 27 via another three-way solenoid valve 106 including a vent port. When the solenoid valve 106 is electrically energized and de-energized, it connects the junction b1 to the vacuum source 27 and the atmosphere respectively.

When the junction a1 communicates with the vacuum source 27, the diaphragm of the vent valve 103 moves toward the junction a1 so that the valve member of the valve 103 admits atmosphere into the junction b2. When the junction b1 communicates with the vacuum source 27, the diaphragm of the vent valve 104 moves toward the junction b1 so that the valve member of the valve 104 admits atmosphere into the junction a2.

The junction a2 is connected to an upper chamber 51a within the cylinder 51. The junction b2 is connected to a lower chamber 51b within the cylinder 51. These chambers 51a and 1b are separated by the piston 52.

The solenoid valve 105 has a pair of electrical input terminals, one input terminal being connected to the positive terminal +Vcc of an electrical power source and the other input terminal being connected to the electrode segments 61b, 63b, 65b, 67b, and 69b of the shift actuator switch 60. It should be noted that the negative terminal of the electrical power source is grounded.

The solenoid valve 106 has a pair of electrical input terminals, one input terminal being connected to the positive terminal +Vcc of the electrical power source and the other input terminal being connected to the electrode segments 61c, 63c, 65c, 67c, and 69c of the shift actuator switch 60.

A control unit 90 preferably including a microcomputer system has electrical ports P1, P2, P3, P4, and P5. The ports P1, P3, and P4 are connected to the electrodes 62, 68, and 70 of the shift actuator switch 60, respectively. The port P2 is connected to the electrode 64 of the shift actuator switch 60 via a normally-open switch 81a of a relay and is also connected to the electrode 66 of the shift actuator switch 60 via a normally-closed switch 81b of the relay. The port P5 is connected to the positive terminal +Vcc of the electrical power source via a control winding 82 of the relay which serves to operate the relay switches 81a and 81b. A control winding 115a of another relay is connected in parallel with the relay winding 82. When the relay winding 115a is energized and de-energized, the associated relay enables and interrupts the supply of electrical power to an electromagnetic clutch (not shown) in order to couple and uncouple the compressor 20 (see FIG. 1) to and from the vehicular engine respectively.

The control unit 90 connects and disconnects the ports P1-P4 to and from ground in accordance with the mode selection signal from the mode selector 36 (see FIG. 1). When the "VENT" mode is selected, the control unit 90 connects only the port P1 to ground via an internal switch. When the "B/L" mode is selected, the control unit 90 connects only the port P2 to ground via an internal switch. When the "HEAT" mode is selected, the control unit 90 connects only the port P3 to ground via an internal switch. When the "DEF" mode is selected, the control unit 90 connects only the port P4 to ground via an internal switch.

The control unit 90 changes activation and deactivation of the compressor 20 in accordance with the atmospheric temperature as in the embodiment of FIGS. 1-4. Activation and deactivation of the compressor 20 is performed by connecting and disconnecting the port P5 to and from ground. When the compressor 20 is to be activated, the control unit 90 connects the port P5 to ground via an internal switch so that the relay control winding 115a is energized. When the compressor 20 is to be deactivated, the control unit 90 disconnects the port P5 from ground so that the relay control winding 115a is de-energized. It should be noted that the negative terminal of the electrical power source is grounded.

When the "VENT" mode is selected, the shift actuator 50 is shifted to a position in which the movable contact 71a extends into the gap 61a in the electrode 61 as shown in FIG. 5.

When the selected mode is changed from the "VENT" mode to the "DEF" mode, the control unit 90 connects the port P4 to the ground so that electrical current flows through the solenoid valve 106 via the electrode segment 69c, the movable contact 71e, the electrode 70, and the port P4, thereby energizing the valve 106. When the solenoid valve 106 is energized, the lower chamber 51b of the shift actuator 50 is exposed to the vacuum source 27 via the valve 106, the junction b1, the check valve 102, and the junction b2. At the same time, the diaphragm of the vent valve 103 is moved toward the junction b2 by the vacuum at the junction b2, allowing the valve member of the valve 103 to block the vent to the atmosphere. Also, the diaphragm of the other vent valve 104 is moved toward the junction b1 by the vacuum at the junction b1, allowing the valve member of the valve 104 to unblock the vent to the atmosphere and thus supplying the atmospheric pressure p to the upper chamber 51a of the shift actuator 50 via the junction a2.

When the upper chamber 51a and the lower chamber 51b of the shift actuator 50 are exposed to atmospheric pressure p and vacuum respectively, the piston 52 moves downwards along the cylinder 51 due to the pressure difference between the chambers 51a and 51b. As the piston 52 moves downwards, the combination of the movable contacts 71a-71e slides downwards along the electrode pairs. When the movable contact 71e moves into the gap 69a in the electrode 69, the electrode segment 69c electrically separates from the electrode 70, opening the electrical circuit through the solenoid valve 106 and thus de-energizing the valve 106. When the solenoid valve 106 is de-energized, the valve 106 admits atmosphere into the junction b1. In this case, the check valve 102 is closed and the vent valve 103 remains closed so that the lower chamber 51b is substantially sealed. The atmospheric pressure at the junction b1 closes the vent valve 104. The check valve 101 remains closed. Thus, the upper chamber 51a is also substantially sealed. As a result, the piston 52 stops at a position in which the side link 80 opens the defroster door 24 only. It should be noted that the shift actuator 50 generates considerable force to move the doors 24, 29, and 33.

When the selected mode is changed from the "DEF" mode to the "HEAT" mode, the control unit 90 connects the port P3 to ground so that electrical current flows through the solenoid valve 105 via the electrode segment 67b, the movable contact 71d, the electrode 68, and the port P3, thereby energizing the valve 105. When the solenoid valve 105 is energized, the upper chamber 51a of the shift actuator 50 is exposed to the vacuum source 27 via the valve 105, the junction a1, the check valve 101, and the junction a2. At the same time, the diaphragm of the vent valve 103 is moved toward the junction a1 by the vacuum at the junction a1, allowing the valve member of the valve 103 to unblock the vent to the atmosphere and thus supplying atmospheric pressure p to the lower chamber 51b of the shift actuator 50 via the junction b2.

When the upper chamber 51a and the lower chamber 51b of the shift actuator 50 are exposed to vacuum and atmospheric presure p respectively, the piston 52 moves upwards along the cylinder 51 due to the pressure difference between the chambers 51a and 51b. As the piston 2 moves upwards, the combination of the movable contacts 71a-71e slides upwards along the electrode pairs. When the movable contact 71d moves into the gap 67a in the electrode 67, the electrode segment 67b electrically separates from the electrode 68, opening the electrical circuit through the solenoid valve 105 and thus de-energizing the valve 105. When the solenoid valve 105 is de-energized, the valve 105 admits atmosphere into the junction a1. In this case, the check valve 101 is closed and the vent valve 104 remains closed so that the upper chamber 51a is substantially sealed. The atmospheric pressure at the junction a1 closes the vent valve 103. The check valve 102 remains closed. Thus, the lower chamber 51b is also substantially sealed. As a result, the piston 52 stops at a position in which the side link 80 opens the floor door 33 and the defroster door 24 but closes the vent door 29.

When the selected mode is changed from the "HEAT" mode to the "B/L" mode, the control unit 90 connects the port P2 to ground. In cases where the control unit 90 connects the port P5 to ground to activate the compressor 20 (see FIG. 1) and thus the relay winding 82 is energized so that the relay switch 81a is closed, the connection between the port P2 and ground allows electrical current to flow through the solenoid valve 105 via the electrode segment 63b, the movable contact 71b, the electrode 64, the relay switch 81a, and the port P2. As a result, the solenoid valve 105 is energized, exposing the upper chamber 51a and the lower chamber 1b of the shift actuator 50 respectively to vacuum and atmospheric pressure P.

This pressure difference between the chambers 51a and 51b of the shift actuator 50 moves the piston 52 upwards. As the piston moves upwards, the combination of the movable contacts 71a-71e slides upwards along the electrode pairs. When the movable contact 71b moves into the gap 63a in the electrode 63, the electrode segment 63b electrically separates from the electrode 64, interrupting the electrical current through the solenoid valve 105 and thus de-energizing the valve 105. As a result, the piston 52 stops at a position in which the side link 80 opens the vent door 29 and the floor door 33 but closes the defroster door 24.

In cases where the control unit 90 disconnects the port P5 from ground to deactivate the compressor 20 (see FIG. 1) and thus the relay winding 82 is de-energized so that the relay switch 81b is closed, the connection between the port P2 and ground effected by the change from the "HEAT" mode to the "B/L" mode allows electrical current to flow through the solenoid valve 105 via electrode segment 65b, the movable contact 71c, the electrode 66, the relay switch 81b, and the port P2. As a result, the solenoid valve 105 is energized, exposing the upper chamber 51a and the lower chamber 51b of the shift actuator 50 to vacuum and atmospheric pressure p respectively.

This pressure difference between the chambers 51a and 51b of the shift actuator 50 moves the piston 52 upwards. As the piston 52 moves upwards, the combination of the movable contacts 71a-71e slides upwards along the electrode pairs. When the movable contact 71c moves into the gap 65a in the electrode 65, the electrode segment 65b electrically separates from the electrode 66, interrupting the electrical current through the solenoid valve 105 and thus de-energizing the valve 105. As a result, the piston 52 stops at a position in which the side link 80 opens all the doors 24, 29, and 33.

When the selected mode is changed from the "VENT" mode to the "B/L" mode, the control unit 90 connects the port P2 to ground. In cases where the control unit 90 connects the port P5 to ground in order to activate the compressor 20 (see FIG. 1) and thus the relay winding 82 is energized so that the relay switch 81a is closed, the connection between the port P2 and ground allows electrical current to flow through the solenoid valve 106 via the electrode segment 63c, the movable contact 71b, the electrode 64, the relay switch 81a, and the port P2. As a result, the solenoid valve 106 is energized, exposing the upper chamber 51a and the lower chamber 51b of the shift actuator 50 to atmospheric pressure P and vacuum respectively.

This pressure difference between the chambers 51a and 51b of the shift actuator 50 moves the piston 52 downwards. As the piston 52 moves downwards, the combination of the movable contacts 71a-71e slides downwards along the electrode pairs. When the movable contact 71b moves into the gap 63a in the electrode 63, the electrode segment 63c electrically separates from the electrode 64, interrupting the electrical current through the solenoid valve 106 and thus de-energizing the valve 106. As a result, the piston 52 stops at a position in which the side link 80 opens the vent door 29 and the floor doors 33 but closes the defroster door 24.

In cases where the control unit 90 disconnects the port P5 from ground to deactivate the compressor (see FIG. 1) and thus the relay winding 82 is de-energized so that the relay switch 81b is closed, the connection of the port P2 to ground effected by the change from the "VENT" mode to the "B/L" mode allows electrical current to flow through the solenoid valve 106 via the electrode segment 65c, the movable contact 71c, the electrode 66, the relay switch 81b, and the port P2. As a result, the solenoid valve 106 is energized, exposing the upper chamber 51a and the lower chamber 51b of the shift actuator 50 to atmospheric pressure p and vacuum respectively.

This pressure difference between the chambers 51a and 51b of the shift actuator 50 moves the piston 2 downwards. As the piston 52 moves downwards, the combination of the movable contacts 71a-71e slides downwards along the electrode pairs. When the movable contact 71b moves into the gap 65a in the electrode 65, the electrode segment 65c electrically separates from the electrode 66, interrupting the electrical current through the solenoid valve 106 and thus de-energizing the valve 106. As a result, the piston 52 stops at a position in which the side link 80 opens all the doors 24, 29, and 33.

When the "B/L" mode is selected, the defroster door 24 is controlled in accordance with activation and deactivation of the compressor 20 (see FIG. 1) as is understood from the above description. Specifically, when the compressor 20 is inactive, the defroster door 24 is opened in addition to the other doors 29 and 33. This prevents the vehicle front and side windows from fogging over. When the compressor 20 is active, the defroster door 24 is closed but the other doors 29 and 33 are open. This allows conditioned air to be effectively directed toward vehicle passengers. It should be noted that when the compressor 20 is active, the evaporator 19 dehumidifies the outgoing air, preventing the vehicle windows from fogging over.

The degree to which the defroster door 24 is opened in the "B/L" mode is chosen so as to reliably prevent the vehicle windows from fogging over and also as to maintain the intrinsic advantage of the "B/L" mode, that is, supplying warmer air to passenger feet or legs than is supplied at passenger chest level.

It should be noted that the defroster door 24 may be controlled directly in accordance with the atmospheric temperature.

What is claimed is:

1. An air conditioner for a vehicle having a window, the air conditioner comprising:
    (a) first means for conditioning air, said first means including an air duct having a defroster outlet, a vent outlet and a floor outlet, and an evaporator, a heater, and an air mixing door located within the air duct;
    (b) second means for moving air to be conditioned through the first means;
    (c) third means, connected to the first means for directing the conditioned air toward the window via the defroster outlet to prevent the window from fogging over;
    (d) fourth means, connected to the first means for directing the conditioned air toward an upper part of a vehicle passenger compartment via the vent outlet;
    (e) fifth means, connected to the first means for directing the conditioned air toward a lower part of the vehicle passenger compartment;
    (f) sixth means for setting a preset bi-level operation mode;
    (g) a cooling compressor connected to the evaporator of the first means; and
    (h) control means for selectively activating and deactivating the compressor and for controlling the third, fourth and fifth means, when a preset bi-level operation mode has been set by the sixth means, to block the defroster outlet, unblock the vent outlet and the floor outlet when the compressor is activated, and to unblock the defroster outlet, the vent outlet and the floor outlet when the compressor is deactivated.

2. The air conditioner of claim 1, further comprising means for sensing atmospheric temperature, wherein the control means activates and deactivates the compressor in accordance with the sensed atmospheric temperature.

3. The air conditioner of claim 1, wherein the third, fourth and fifth means each comprises a movable door for blocking and unblocking the defroster outlet, the vent outlet, and the floor outlet, respectively, a pressure-responsive actuator for actuating the movable door, and means for adjusting the pressure supplied to the actuator in accordance with the activation and deactivation of the compressor.

* * * * *